United States Patent [19]
Buchanan et al.

[11] 3,734,104
[45] May 22, 1973

[54] METHOD FOR EXPANDING TOBACCO STEMS

[75] Inventors: William Michaux Buchanan, John W. Madures, both of Richmond, Va.

[73] Assignee: Philip Morris Incorporated, New York, N.Y.

[22] Filed: Nov. 4, 1971

[21] Appl. No.: 195,613

[52] U.S. Cl. ................................................. 131/140 P
[51] Int. Cl. ............................................. A24b 03/18
[58] Field of Search ............... 131/140–144, 15, 2, 17

[56] References Cited

UNITED STATES PATENTS

| 2,344,106 | 3/1944 | Reed | 131/140 P |
| 2,596,183 | 5/1952 | Sowa | 131/140 P |
| 3,524,452 | 8/1970 | Moser et al. | 131/140 P |
| 3,529,606 | 9/1970 | de la Burde | 131/140 P |

Primary Examiner—Melvin D. Rein
Attorney—Elmer R. Helferich et al.

[57] ABSTRACT

Expanded tobacco stems are produced having increased filling capacity. Rolled, crushed tobacco stems are cut to filler size and adjusted to a moisture content of about 24 to 60 percent by weight. The high moisture cut stems are subjected to hot gas containing at least 30 percent steam, whereby the moisturized stems are heated to about 250° to 750°F. for about 0.5 to less than 3 seconds. By this process, the filling capacity of the expanded cut stems is increased from 30 to 50 percent or more and the apparent density is materially reduced in comparison to that of an unexpanded control.

7 Claims, No Drawings

METHOD FOR EXPANDING TOBACCO STEMS

BACKGROUND OF THE INVENTION

Various procedures have been suggested for increasing the filling capacity of tobacco stems. An illustrative patent in this respect is Jones, U.S. Pat. No. 3,204,641, in which tobacco stems are moisturized to a water content of about 40 to 65 percent, shredded in a disc refiner shredding unit into large pieces of approximately 30 mesh or greater and then is dried by infrared heater or similar means to a moisture content of about 11 to 18 percent. The only specific indication of increased filling capacity in this patent is in Example I, that the stems can be so treated as to approximate the filling capacity of conventional cigaret cut leaf filler and that there is a 25 percent increase as compared to prior art stems, which is apparently the maximum reached in the patented process.

A Wright patent, U.S. Pat. No. 3,357,436 discloses the drying of cut or green tobacco having a moisture content of about 17 – 19 percent to a desired moisture content for end use in which the leaf is dried using hot air containing about 10 to 20 percent water vapor. A series of drying towers are used, indicating that the drying is relatively a low-temperature, slow-drying operation. The seriatim drying steps are stated to reduce the density of the tobacco and to increase its filling power but no specific figures appear to be disclosed. However, the Wright patent is essentially concerned with drying and increasing the filling capacity of tobacco leaf rather than the expansion of tobacco stems that would require special treatment to produce a satisfactory filler material.

Other patents describing the treatment of tobacco stems to expand them and presumably increase the filling capacity are certain de la Burde patents, namely, U.S. Pat. Nos. 3,409,022, 3,409,023, and 3,529,606. These patents teach special ways of heating tobacco stems, usually before any cutting to filler dimension, utilizing in general, radiant or microwave energy, or merely hot gaseous contact. Special care is suggested to prevent toasting or burning. Nothing appears to be said or consideration given to any moisturization to a specific level before the heating step.

As indicated, the prior art generally teach expanding tobacco leaf or stems and then cutting the expanded material to filler size. It has been found that stems that are puffed before cutting require a specially developed cutter and blades, in order to prevent collapse of the puffed stems and to retain the expansion. Moreover, cutting or slicing long stems or large pieces results in the shattering of the stem particles so that considerable waste is produced.

The present process involves the expansion of either burley or bright tobacco stems after they have been cut to filler size, thus avoiding any later drastic manipulation that would affect the expansion materially. Consequently, the expansion itself results in producing expanded tobacco stems already in filler size with a materially increased filling capacity of the tobacco stems and a substantial reduction in both bulk and apparent densities.

SUMMARY OF THE INVENTION

The invention relates to an improvement in the treatment of tobacco stems whereby the filling capacity of the tobacco stems is substantially increased and the density reduced as compared to ordinary cut tobacco stems normally used in filler.

The process involves the steps of (1) rolling and crushing tobacco stems, (2) cutting the stems to filler size, (3) adding moisture to the cut stems so they contain from 24 to 60 percent moisture, and (4) rapidly heating and expanding the moisturized stems in less than 3 seconds by direct contact with steam or an over 30 percent steam-gas mixture heated to 250° to 750°F.

DESCRIPTION OF THE INVENTION

In the practice of the invention, tobacco stems are moistened and then flattened or crushed, by known methods. The crushed stems are then cut to filler size. The cut stems, are treated with water or steam to bring the moisture of the cut stems to a relatively high point, substantially above the usual moisture content. Thereafter, the moist cut stems are quickly heated in a matter of a few seconds or less with steam or a mixture of steam and hot gases which result in the rapid expansion of the moisture-laden stem cells without producing any material scorching or undue darkening of the treated product. The expanded product, being already cut to filler dimensions, needs little or no further processing for cigaret manufacture or the like.

The present invention starts with either bright or burley stems that have first been moistened with steam or, if preferred, cased, and then rolled and crushed by known procedures. The crushed stems are then cut to filler size by conventional methods, namely, at 75 to 200 cuts per inch, preferably from 75 to 175 cuts per inch, and more preferably about 100 to 150 cuts per inch.

The cut stems are now impregnated with water or steam to the selected water content utilizing any suitable mixing cylinder or container. Impregnation time can vary from a few seconds to 24 hours with temperature and pressure conditions suitable to the operator, although ordinary room temperatures and atmospheric pressures are satisfactory. Water impregnation is carried out to result in at least about 24 percent and up to about 60 percent by weight of moisture in the cut tobacco stems. Preferably about 40 to 60 percent moisture content produces excellent results. In general, the cut tobacco is permitted to equilibrate in the moisturizing zone to the selected moisture within the indicated range. This equilibration will depend upon the selected conditions of the process operation, namely, the moisture content of the rolled, crushed and cut tobacco stems initially, the precise amount of moisturizing selected within the necessary boundaries and the type of operation to be used, whether continuous or batch operation.

After the rolled and cut stems have been properly impregnated with water, they are then passed to a heating zone and intimately commingled with steam or a high content steam and hot gas mixture to quickly remove water in as short a time as possible, preferably in less than 3 seconds, with a gaseous medium contact time of the order of about 0.5 to about 2 seconds or slightly more.

The heated puffing or expansion gas may be superheated steam alone or steam mixed with air or other relatively inert gas such as nitrogen, carbon dioxide, burner exhaust gas or the like. In accordance with the invention, it has been found that the steam content of the gas should be substantially above 10 percent by volume and preferably at least 30 percent by volume and more preferably at least 70 percent by volume. The temperature of the hot gas in contact with the water-impregnated tobacco stems should be between 250° and 750°F. and it will be obvious that the longer exposure time will be associated with low temperatures, whereas at 750°F, an exposure time of about 0.5 second or even slightly less is sufficient.

The rapid removal of water within the short time indicated as well as the steam content of the hot gases is necessary to prevent degradation of the color and flavor of the rolled and cut tobacco stems and yet achieve a substantial volume increase of the cut stems. Additionally, this rapid operation not only prevents degradation but also reduces the amount of dust and fines that would be created if one operated for an undue length of time even at temperatures as low as 250°F.

The heating and expansion operation is preferably carried out in a vertical tower or column which may be a Proctor & Schwartz PB dispersion drier or the equivalent, coupled with a separator. In such an apparatus, the hot steam or steam-gas mixture and the moistened cut stems enter near the bottom of the tower and exit at the top. A separator connected at the top of the expander permits further additional contact of the stems and hot gases and at the same time provides for separation of the puffed tobacco from the steam or steam-gas mixture. These gases may then be recycled and reheated for continuous operation. With conditions adjusted properly, the treated and expanded product may leave the heating zone with a retained moisture content of about 8 to 16 percent by weight and can thus be used in cigaret filler or the like without reordering or further treatment.

By the process of this invention, the filling capacity of expanded cut stem filler is increased at least 30 percent or more, usually at least 50 percent, and almost doubled, ranging from about 45 to about 70 cc/10g. whereas the filling capacity of untreated stems range from about 30 to 40 cc/10g.

In measuring and determining filling capacity, a standard procedure is used in which a graduate cylinder is filled with a selected amount of tobacco filler. The filler is compressed under a mass at 2.8 psi for approximately 5 minutes. The units of measurement are read directly from the graduate scale in cc/10g. of sample. This pressure of 2.8 psi is comparable with respect to the usual method of producing a tobacco rod on a cigaret maker. Since moisture affects the filling capacity, samples of expanded and control material are tested at a comparable moisture content, specifically, with a moisture content of 10–13 percent.

The amount of expansion can also be indicated by the reduction in bulk density. This is expressed in g/cc and is obtained by multiplying the reciprocal of the filling capacity by 10. In the present case, the bulk density of the products produced by this invention will range from about 0.143 to 0.222 g./cc.

There is also a reduction in apparent density when compared to conventional stems, noting the fact that the apparent density of conventional stem filler ranges from 1.18 to 1.30 g/cc, whereas the products produced by the process described here have a lower apparent density, ranging generally from about 0.70 to about 1.0 g/cc. Any suitable method such as the pycnometer or a Fisher specific gravity apparatus can be used to determine apparent density. A still further method is to use a perforated metal case for holding a selected amount of tobacco. The weight of the container in air versus the weight in liquid, such as acetone, is measured and the density calculated.

The following examples are illustrative of the invention.

EXAMPLE 1

Bright rolled stems (RKS) cut filler at 150 cuts/inch containing 12.5 percent moisture and having a cylinder volume of 32 cc/10g was impregnated by spraying it with water until RKS was at 40 percent moisture. After 24 hours equilibration time, the sample was passed through a P.B. dispersion dryer (heating tower) at 375°F. and 100 percent steam atmosphere with a linear gas velocity of 132 ft/sec. The RKS residence time in the heating tower was approximately 1 second. At this time the RKS was quite expanded and had an apparent density of approximately 0.83 g/cc compared to unexpanded RKS control stems with an apparent density of 1.27 g/cc.

The expanded RKS was delivered from the tower at approximately 12 percent moisture with a filling capacity of approximately 48 cc/10g. This was about a 50 percent increase in filling capacity compared to the original volume of the control stems.

Cigarets were fabricated from the expanded rolled stems using the conventional manner of blending with leaf and cigaret making. Control cigarets were made from the untreated RKS and physical properties of the expanded and unexpanded cigarets are compared in the following Table I.

TABLE I

| Measurement[1] | Control[2] | Expanded[2] |
|---|---|---|
| Weight, g/rod | 0.920 | 0.840 |
| Resistance to Draw, in. | 1.90 | 1.80 |
| Firmness, mm × 10 | 29.2 | 29.5 |
| Circumference, mm | 25.20 | 25.20 |
| Moisture, % | 12.50 | 12.50 |
| TPM deliv., mg. | 21.4 | 20.2 |

[1] Data based on an average of 100 cigarets at 64 mm rod length
[2] Cigarets equilibrated at 62% humidity for 76 hours

EXAMPLE 2

Rolled stems (RKS) cut at 100 cuts/inch and 24 percent moisture were equilibrated for 24 hours. The sample was passed through the P.B. dispersion dryer at 350°F., 130 ft/sec linear velocity and 100 percent steam atmosphere. Residence time in the heating tower was approximately 2 seconds. The cut stems, exiting at 12.0 percent moisture had expanded to an apparent density of 0.90 g/cc with a filling capacity of approximately 45 cc/10g compared to an RKS control at an apparent density of 1.25 g/cc and a filling capacity of 31 cc/10g at 12.0 percent moisture.

EXAMPLE 3

Samples of bright rolled stems (RKS) at 100, 150, and 200 cuts/inch were sprayed with water in order to achieve 24, 40, and 50 percent moisture at each cut/inch. After 24 hours impregnation time the samples were passed through the heating tower at different inlet temperatures and steam-to-air ratios with residence time in the tower of 0.4 to 1.2 seconds, the longer time being given for the lower temperatures. The samples exited the tower below 10 percent moisture and in the neighborhood of about 8 percent moisture. Table II shows the results of the different runs.

The data show that as the temperature increases in the tower, the apparent density of the product decreases when other parameters are unchanged. Similarly, an increasing steam/air ratio produces lower apparent density. Increasing the water content in the RKS before expansion was observed to reduce or prevent scorching, while the product exits with enough retained moisture to obviate remoistening.

TABLE II

| Run No. | Tower Inlet Temp. °F. | Steam/Air Ratio | % Moisture Of RKS Before Expansion | Apparent Density g/cc cuts/inch 100 Cuts | 150 Cuts | 200 Cuts |
|---|---|---|---|---|---|---|
| 1 | 750 | 70/30 | 24 | 0.61 | 0.63 | 0.67 |
| 2 | 750 | 80/20 | 24 | 0.59 | 0.66 | 0.67 |
| 3 | 750 | 30/70 | 24 | 0.78 | 0.83 | 0.86 |
| 4 | 750 | 50/50 | 24 | 0.71 | 0.76 | 0.77 |
| 5 | 550 | 70/30 | 24 | 0.82 | 0.93 | 0.93 |
| 6 | 550 | 80/20 | 24 | 0.81 | 0.91 | 0.92 |
| 7 | 550 | 30/70 | 24 | 0.96 | 1.03 | 1.06 |
| 8 | 550 | 50/50 | 24 | 0.90 | 0.99 | 0.99 |
| 9 | 750 | 70/30 | 40 | 0.65 | 0.69 | 0.72 |
| 10 | 750 | 80/20 | 40 | 0.58 | 0.67 | 0.71 |
| 11 | 750 | 30/70 | 40 | 0.83 | 0.88 | 0.87 |
| 12 | 750 | 50/50 | 40 | 0.79 | 0.79 | 0.83 |
| 13 | 750 | 90/10 | 40 | 0.64 | 0.69 | 0.72 |
| *14 | 750 | 10/90 | 40 | 0.90 | 0.92 | 0.96 |
| *15 | 550 | 10/90 | 40 | 1.04 | 1.04 | 1.10 |
| 16 | 550 | 30/70 | 40 | 0.99 | 1.03 | 1.06 |
| 17 | 550 | 50/50 | 40 | 0.95 | 0.92 | 0.99 |
| 18 | 550 | 70/30 | 40 | 0.87 | 0.91 | 0.94 |
| 19 | 550 | 80/20 | 40 | 0.78 | 0.81 | 0.85 |
| 20 | 550 | 90/10 | 40 | 0.73 | 0.76 | 0.81 |
| 21 | 750 | 70/30 | 60 | 0.89 | 0.87 | 0.85 |
| 22 | 750 | 80/20 | 60 | 0.91 | 0.85 | 0.81 |
| 23 | 750 | 50/50 | 60 | 0.92 | 0.95 | 0.93 |
| 24 | 750 | 30/70 | 60 | 0.94 | 1.0 | 1.0 |
| *25 | 550 | 10/90 | 60 | 0.91 | 0.89 | 0.95 |
| 26 | 550 | 90/10 | 60 | 0.94 | 0.98 | 0.94 |
| 27 | 550 | 80/20 | 60 | 0.95 | 0.98 | 0.99 |
| 28 | 550 | 70/30 | 60 | 0.97 | 0.93 | 0.89 |
| 29 | 550 | 50/50 | 60 | 0.90 | 1.03 | 1.06 |
| 30 | 550 | 50/50 | 60 | 0.89 | 0.94 | 1.03 |
| Control (No. Expansion) | | | 12.5 | 1.23 | 1.27 | 1.30 |

*Product scorched

EXAMPLE 4

One hundred pounds of bright RKS 24 percent moisture and 150 cuts/inch were sprayed with water at ambient conditions to achieve a 40 percent moisture level. The sample was equilibrated for 24 hours. The cut stems were then expanded in a 3 inch tower 8 ft. in length, (feed 160 g/min) at different temperatures while maintaining a 100 percent steam atmosphere at linear velocities of 132 ft/sec, at 350°F. to 140 ft/sec. at 450°F. The moisture of the expanded samples from the tower varied from 6–16 percent depending on the conditions. The residence time in the tower was between about 0.6 to 1.0 second. Data in Table III show the effect of expansion on density at the different exit moistures.

TABLE III

| Run No. | Inlet Temp. °F. | % Moisture of rks before Expansion | Density, g/cc, 150 Cuts/in. | % Moisture of RKS After Expansion |
|---|---|---|---|---|
| 75 | 400 | 40 | 0.89 | 9.7 |
| 76 | 400 | 40 | 0.86 | 8.0 |
| 77 | 450 | 40 | 0.85 | 8.0 |
| 78 | 350 | 40 | 0.99 | 16.0 |
| 79 | 350 | 40 | 1.01 | 14.5 |
| 80 | 350 | 40 | 0.92 | 13.8 |
| 81 | 375 | 40 | 0.88 | 10.5 |
| 82 | 400 | 40 | 0.88 | 8.5 |
| 83 | 425 | 40 | 0.82 | 6.0 |

EXAMPLE 5

A burley RKS filler at 150 cuts/inch containing 11.0 percent moisture and having a cylinder volume of 42.5 cc/10g was impregnated by spraying it with water until the cut stems were at 40 percent moisture. After 24 hours equilibration time, the sample was passed through a steam atmosphere with a linear gas velocity of 132 ft/sec. The residence time of the cut stems in the heating tower was approximately 2 seconds. At this time the rolled cut stems were quite expanded and had an apparent density of approximately 0.79 g/cc compared to an unexpanded RKS control with an apparent density of 1.13 g/cc.

The puffed cut stems exited from the tower at approximately 11.0 percent moisture with a filling capacity of approximately 59.5 cc/10g.

This was about a 40 percent increase in filling capacity compared to the original cylinder volume of the control burley rolled cut stems.

EXAMPLE 6

Bright RKS cut filler at 150 cuts/inch and 24 percent moisture was fed directly into an ordering cylinder at approximately 130g/min flow rate. Normal tap water was sprayed on the cut stems at approximately 63g/min in order to increase the moisture of the cut stems to approximately 40 percent. Residence time in the ordering cylinder was approximately 8 seconds. The expansion tower inlet temperature was set at 425°F. using a 100 percent steam atmosphere at a linear gas velocity of 130 ft/sec. The cut filler at 40 percent moisture was fed directly into the puffing tower at approximately 193g/min. Residence time in the tower was about 0.80 second. The cut stem feed rate was constant over a 30 minute period. The cut stems exiting from the outlet of the tower contained approximately 6 percent moisture and were reordered to 13 percent moisture. Total elapsed time for the processes of impregnation and expansion was below 12 seconds.

|  | % Moisture Final Product | Apparent Density | Cylinder-Bulk Density g/cc |
|---|---|---|---|
| Control (no expansion) | 12 | 1.25g/cc | 0.315 |
| Treated stems | 13 | 0.77g/cc | 0.211 |

EXAMPLE 7

The experiment of Example 6 was repeated using steam to order the bright RKS to approximately 38 percent. The steam was sprayed directly into the ordering cylinder where the cut stems were being fed through. The final moisture in the expanded treated stems was 12.5 percent and the filling capacity was 47 cc/10g, thus showing approximately a 47 percent increase in filling capacity over the control RKS.

EXAMPLE 8

The experiment of Example 7 was repeated using burley RKS instead of bright. The final moisture in the puffed stems was approximately 10.5 percent and the filling capacity was 53 cc/10g, representing a 60 percent increase over the control.

EXAMPLE 9

Samples of bright RKS cut filler at 150 cuts/inch were sprayed with water in order to achieve a 40 percent moisture level. After 24 hours impregnation time the samples were passed through the tower at different inlet temperatures at a 100 percent steam atmosphere. The flow rate varied from 132 ft/sec at 350°F. to an estimated 160 ft/sec and the residence time of the samples in the tower varied from about 0.6 to 1.0 second. The expanded product exited from the tower from about 8 to less than 10 percent moisture. Table V shows the results of these runs.

TABLE V

| Run No. | Inlet Temp. °F. | Steam/Air Ratio | % Moisture of RKS Before Expansion | Apparent Density, g/cc |
|---|---|---|---|---|
| 90 | 350 | 100 | 40 | 0.93 |
| 94 | 375 | 100 | 40 | 0.95 |
| 96 | 400 | 100 | 40 | 0.77 |
| 97 | 425 | 100 | 40 | 0.72 |
| 99 | 450 | 100 | 40 | 0.84 |
| 100 | 500 | 100 | 40 | 0.75 |
| 101 | 550 | 100 | 40 | 0.71 |
| 102 | 600 | 100 | 40 | 0.65 |
| Control RKS | | | 12.5 | 1.27 |

EXAMPLE 10

Bright RKS cut filler at 150 cut/inch and 24 percent moisture was fed directly into an ordering cylinder at approximately 110g/min. flow rate. Normal tap water was sprayed on the cut stems to increase the moisture to approximately 40 percent. Residence time in the ordering cylinder was approximately 19 seconds. The expansion tower inlet temperature was set at 375°F. using steam atmosphere at a linear gas velocity of 130 ft/sec. The RKS cut filler at 40 percent moisture was fed directly into the expansion tower at approximately 170g/min. Residence time in the tower was approximately 0.90 seconds. The RKS feed rate was constant over a 30 minute period. The stems exiting from the outlet of the tower contained approximately 10 percent moisture. Total elapsed time for the processes of impregnation and expansion was below 12 seconds.

| Type Bright RKS | Apparent Density g/cc | Cylinder Volume cc/10g | Cylinder Bulk Density g/cc | % Moisture |
|---|---|---|---|---|
| Control | 1.25 | 34.0 | 0.2941 | 11.8 |
| Treated | 0.82 | 50.7 | 0.1972 | 12.5 |

EXAMPLE 11

The experiment of Example 10 was repeated using burley rolled stems at 150 cuts/inch and 24 percent moisture in place of bright rolled stems. The results of the experiment are as follows:

| Type Burley RKS | Density g/cc | Cylinder Volume cc/10g | Cylinder Bulk Density g/cc | % Moisture |
|---|---|---|---|---|
| Control | 1.150 | 39.0 | 0.2564 | 13.5 |
| Treated | 0.759 | 63.0 | 0.1587 | 11.1 |

The products of the invention as shown by the examples given above are characterized in that these cut expanded stems have a reduced apparent density and increased filling capacity when compared to untreated rolled tobacco stems cut to filler dimensions. It is also worthy of note that the products as produced by the described process generally show a lower apparent density and higher filling capacity even over conventional leaf filler. The reductions in density and the fact that the product is already cut as filler results in a substantial saving in tobacco costs in manufacturing cigarets and other related tobacco products.

The invention that is claimed is:

1. The process of expanding tobacco stems and increasing their filling capacity consisting essentially crushing and then cutting tobacco stems to cigaret filler dimensions, adjusting the cut tobacco stems to a moisture content of not less than 24 percent to about 60 percent by weight, and then without further stem treatment passing the moisturized stems into a heating and expansion zone, intimately and rapidly contacting the moisturized stems with a hot gaseous heating medium at a temperature in the range of about 250° to 750°F. for about 0.5 to less than 3 seconds, said gaseous heating medium comprising at least about 30 percent by volume of steam.

2. The process of claim 1, wherein the stems are cut from 75 to 175 cuts/inch before moisture adjustment.

3. The process of claim 2, wherein the cut stems are moisturized to about 40 to 60 percent by weight prior to the heating step.

4. The process of claim 1, wherein the cut tobacco stems are moisturized with water or steam before heating.

5. The process of claim 1, wherein the gaseous heating medium is superheated steam.

6. The process of claim 1, wherein the filling capacity of the expanded tobacco stems ranges from about 45 to 70 cc/10 grams.

7. The process of claim 1, wherein apparent density of the expanded tobacco stems ranges from about 0.70 to 1.0 g/cc.

* * * * *

UNITED STATES PATENT OFFICE
CERTIFICATE OF CORRECTION

Patent No. 3,734,104             Dated  May 22, 1973

Inventor(s) William Michaux Buchana and John W. Matures

It is certified that error appears in the above-identified patent and that said Letters Patent are hereby corrected as shown below:

Column 4, line 60, "50" should be -- 60 --.

Claim 1, line 3, insert -- of -- before "crushing".

Signed and sealed this 9th day of April 1974.

(SEAL)
Attest:

EDWARD M. FLETCHER, JR.
Attesting Officer

C. MARSHALL DANN
Commissioner of Patents